United States Patent [19]

Moody

[11] 4,370,062
[45] Jan. 25, 1983

[54] DISPENSING GUN FOR TWO-PART ADHESIVES

[76] Inventor: Warren E. Moody, 95 Fiesta Way, Fort Lauderdale, Fla. 33301

[21] Appl. No.: 122,081

[22] Filed: Feb. 19, 1980

[51] Int. Cl.³ .............................................. B01F 5/20
[52] U.S. Cl. ..................................... 366/130; 138/42; 239/432; 366/177; 366/182; 366/336
[58] Field of Search ................................ 366/336–340, 366/129, 130, 177, 182; 239/414, 432; 138/42

[56] References Cited

U.S. PATENT DOCUMENTS

| | | | |
|---|---|---|---|
| 2,118,295 | 5/1938 | Crawford et al. | 138/42 |
| 3,129,926 | 4/1964 | Hodges | 366/336 X |
| 3,330,484 | 7/1967 | Johnson et al. | 239/414 |
| 3,338,561 | 8/1967 | Schweer | 366/336 X |
| 3,361,412 | 1/1968 | Cole | 239/432 X |
| 3,801,009 | 4/1974 | Marshall | 239/414 X |
| 3,948,479 | 4/1976 | Bedo et al. | 138/42 X |
| 4,117,551 | 9/1978 | Books et al. | 366/339 X |

Primary Examiner—Philip R. Coe
Attorney, Agent, or Firm—Edwin E. Greigg

[57] ABSTRACT

This invention relates to improvements in dispensing guns and more particularly to guns of the type provided with dual conduits into which plural streams of two parts of adhesives can be fed and later intimately mixed in the detachable nozzle at the end of the gun immediately prior to application of the mixture to a surface.

2 Claims, 8 Drawing Figures

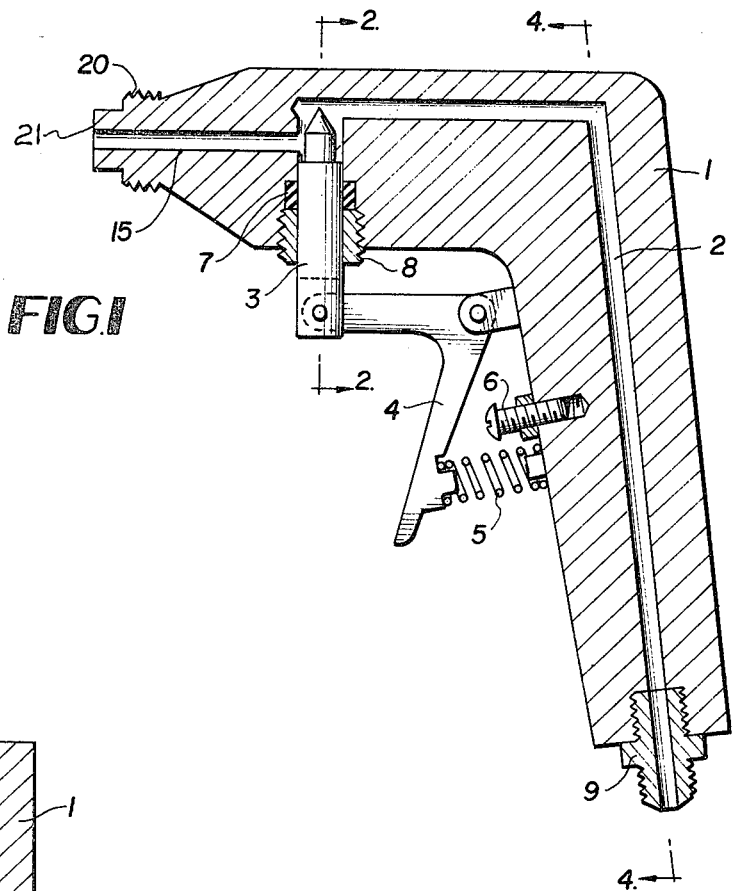
FIG.1
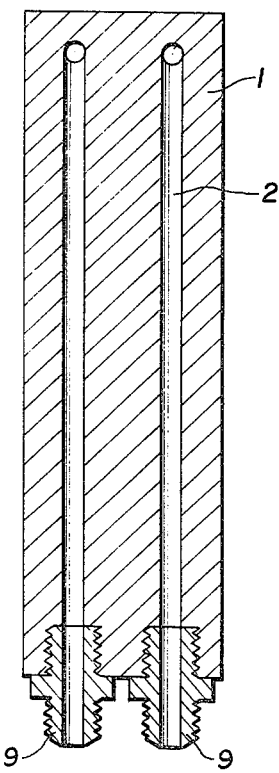
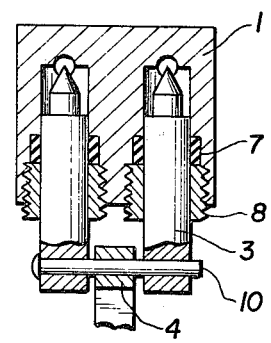
FIG.2
FIG.4

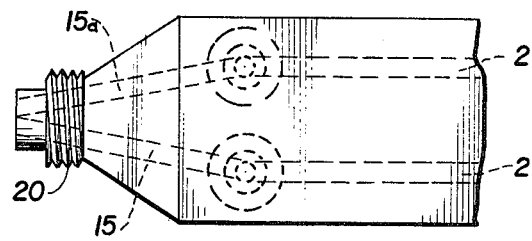
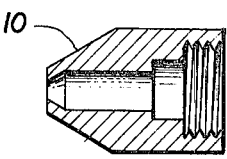
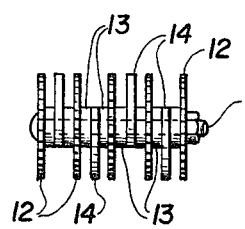
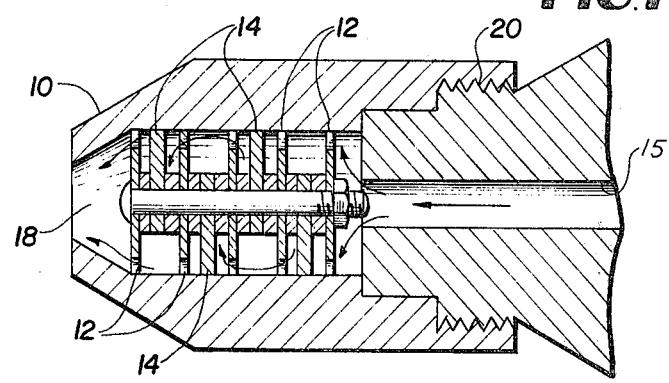
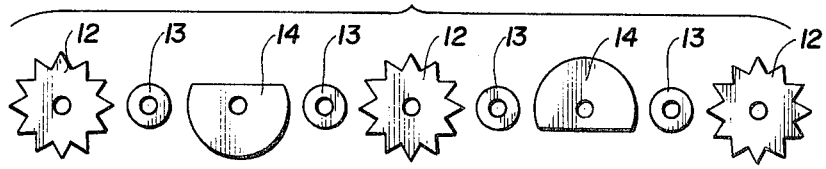

DISPENSING GUN FOR TWO-PART ADHESIVES

BACKGROUND OF THE INVENTION

My invention relates to the dispensing of modern two-part adhesives in a convenient and expeditions manner suitable for fast production of boats, house trailers, furniture, prefabricated housing and other uses that will occur to those skilled in this act.

Previous methods of taking carefully prescribed amounts of each part of a two-part adhesive and mixing them together in a pot or on a convenient surface and quickly applying to the parts to be bonded resulted in wasted time and material as it was difficult to accurately estimate the correct amounts of the compounds comprising the mixture desired.

Furthermore, the pots and other mixing equipment had to be properly cleaned or they would be of no further use.

To overcome these and other objections, I have devised a novel dispensing gun equipped with two separate feed channels for feeding two-part ashesives to a detachable mixing chamber which will lay out a thoroughly mixed bead comprising two separate components upon the surface to be bonded. The two separate parts being accurately metered into the mixing chamber by proper adjustment of suitable control valves, the pot pressure and the viscosity of the materials.

OBJECT AND SUMMARY OF THE INVENTION

The primary object of this invention is to provide a gun capable of maintaining a uniform, constant and completely separate flow of two separate components of adhesives which are fed to supply conduits attached to the gun so that there is no need to disassemble or clean the system of residual mixed materials which remains ready for instant use regardless of intervals between which the gun is used.

The invention will be better understood, and further objects and advantages thereof will become more apparent from the ensuing detailed description of a preferred embodiment taken in conjunction with the drawings.

BRIEF DESCRIPTION OF THE DRAWINGS

FIG. 1 shows a cross-sectional view of the gun along one of its flow channels with its mixing chamber removed therefrom;

FIG. 2 is a sectional view on line A—A of FIG. 1;

FIG. 3 is a partial top plan view showing the convergence of the two-part channels in dotted outline;

FIG. 4 is a cross-sectional view on line X—X of FIG. 1 showing the two internal channels and conduit connectors;

FIG. 5 shows a detachable mixing chamber;

FIG. 6 shows a removable assembly of baffle elements;

FIG. 7 is a cross-sectional view of the assemblage of baffle elements which are positioned in a bore in the detachable mixing chamber; and FIG. 8 is an exploded view showing the mixing baffle elements prior to assembly in the bore of the mixing chamber.

DESCRIPTION OF THE PREFERRED EMBODIMENT

Turning now to the drawings, in operation the gun 1 will be fed with two separate components of an adhesive by two separate conduits which are attached to the nipple 9—9 with the material components arranged to pass through the dual channels 2—2 and to be under the two control of the separate needle valves 3—3 by means of the trigger 4. The trigger 4 is spring-loaded by the element 5 and a stop 6 is fixed to the gun to control the maximum quantity of material permitted to pass through the channels 2—2. The valve stems 3 are positioned in valve stem packing 7 and a packing nut 8 is threaddedly secured into the gun to control the pressure about the shank of each of the needle valves 3—3.

Channels 15 and 15a feed the separate materials from the respective control valves 3—3 to a mixing chamber 18 screw threaded onto end 21 by threads 20. Mixing chamber 18 includes therein baffle elements 11, 12, 13 and 14 which function to mix the materials admitted into the mixing chamber through channels 15 and 15a. The baffle elements are shown more clearly in FIGS. 6 and 7.

With further reference to FIG. 7, the assembly of baffle elements shown individually in FIG. 8 are placed seriatim upon the shank 11 of the support element in an array wherein the star-shaped elements 12 are interspersed along the length of the shank 11 with spacer members 13 and partial washers 14 which are rotated 180° to provide an undulatory path of flow of the fluid streams of adhesive after they leave the passages 15-15a in the gun body. It will be apparent that this undulatory path of flow will provide an intimate mixing of the two components of materials after they pass out of the gun channels 15 and 15a and into the mixing chamber 18.

The bead size and shape may be controlled by the size and shape of the nozzle element as well as the viscosity of the ingredients plus variation of the pressure in the containers and adjustment of the trigger stop.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. A gun-type dispensing gun for mixing two separate components of material which comprises:
    a gun body including a handle end and a nozzle end;
    two separate feed channels in said body connected at said handle end for feeding different materials to be dispensed;
    a separate control valve for controlling material flow through each of said feed channels;
    two separate discharge channels extending from said control valves to said nozzle end of said body;
    a single manually operable handle means for simultneously operating said valves to permit material flow from said separate feed channels to said separate discharge channels;
    a mixing chamber removably secured to said nozzle end of said body;
    a plurality of separate mixing baffle elements assembled within said mixing chamber, said mixing baffle elements comprise alternating perforated dispersion washer and clipped-edge solid washers separated by suitable spacers with all of said mixing baffle elements secured together by suitable means and the clipped-edge washers being oriented to provide a zig-zag path for the material passing through the assemblage; whereby said plurality of baffle elements are contained within said mixing chamber and removable simultaneously with said mixing chamber.

2. A gun-type device as claimed in claim 1, wherein said separate control valves operating means is spring-loaded to be normally closed and the extent of opening being determined by an adjustable stop.

* * * * *